United States Patent [19]

Dadt

[11] Patent Number: 5,375,464
[45] Date of Patent: Dec. 27, 1994

[54] PROCESS FOR DEVICE FOR STEERING VEHICLE WHEELS ROLLING ON TEST STANDS

[75] Inventor: Hans J. Dadt, Hepperheim, Germany

[73] Assignee: Carl Schenck AG, Germany

[21] Appl. No.: 37,327

[22] Filed: Mar. 26, 1993

[30] Foreign Application Priority Data

May 29, 1992 [EP] European Pat. Off. ............ 92109007

[51] Int. Cl.⁵ ............................................. G01M 17/00
[52] U.S. Cl. ..................... 73/146; 73/11.04; 180/198
[58] Field of Search ................ 180/79.1, 198; 364/424.03; 73/146, 147, 8, 11.04, 11.07, 11.08, 11.09

[56] References Cited

U.S. PATENT DOCUMENTS 4,912,970  4/1990  Gicewicz ............................ 73/146

*Primary Examiner*—Richard E. Chilcot, Jr.
*Assistant Examiner*—Joseph L. Felber
*Attorney, Agent, or Firm*—Connolly & Hutz

[57] ABSTRACT

A process steers vehicle wheels rolling on test stands in order to determine vehicle behavior under actual operating conditions. In order to reproducibly create anticipated riding comfort on the test stand which, in addition to the swaying and shaking motions of the vehicle itself also includes the avoidance of driving noises in the interior of the vehicle and also noises that arise when the trunk and hood make movements relative to the chassis when subjected to great vertical forces, the wheels are steered only as a function of the measurable lateral excursions of one point of a vehicle part from its resting position with respect to a stationary reference point present outside of the vehicle. These excursions occur as a result of lateral motions of the vehicle.

4 Claims, 2 Drawing Sheets

PROCESS FOR DEVICE FOR STEERING VEHICLE WHEELS ROLLING ON TEST STANDS

BACKGROUND OF THE INVENTION

The present invention relates to a process and device for steering vehicle wheels rolling on test stands in order to determine vehicle behavior under actual operating conditions.

Among other things, vehicle test stands serve to examine, for example, the braking behavior of vehicles during the development and production stages. Moreover, such test stands, which can be designed with flat belt units or running drums, are used to measure the camber and track of the vehicle and also to test the behavior of the vehicle during actual operation. Also, these test stands are used to apply parameters previously ascertained on test runs, for example, pertaining to the spring deflection and swaying or shaking of a vehicle on the drive unit of the flat belt or drum-type test stand, in order to use the test stand to examine selected operating conditions of vehicles that have already been completed. Then, on the basis of these test results, the vehicles can be improved with respect to the anticipated conditions.

In order to be able to carry out such tests, it has been a known process to seat a driver in the vehicle, who then either motivates the test stand by means of the rolling wheels when the engine of the vehicle is running or else the driven test stand moves the wheels rolling on it without their being driven by the engine. It is also possible to employ a combination of both on these test stands whereby the test stand rollers or flat belts as well as the vehicle are driven.

Other possibilities for keeping a vehicle on the test stand while it is being tested are the so-called anchoring of the vehicle to the test stand, in other words, the chassis is anchored to the test stand or to the surrounding work area in such a manner that the vehicle cannot leave the test stand, even when improper loads are imposed.

Moreover, it is possible to use a steering system to keep the vehicle on track without a driver by guiding the vehicle's steering mechanism and thus to conduct test runs.

The measures described above to laterally hold the vehicle on test stands are also used for test stands where either only the steered axle of the vehicle or only the non-steered axle of the vehicle is in contact with a test stand. In this process, the vehicle can be driven on the test stand via the steered wheels or else via the non-steered wheels.

The above-mentioned steering systems correct the lateral motions of the vehicle by turning the vehicle's steering wheel. A familiar passive system consists in holding the steering wheel in an articulated manner by means of a rod or the like arranged perpendicular to the vehicle on a fixed point of the building or of the foundations so that the vehicle steers itself when it is moved, but only when no significant vertical forces occur in the test stand.

However, if great vertical forces occur in test stands, be it due to the superimposition of influencing variables in the horizontal direction or be it intentionally due to the exertion of additional vertical forces which, for example, simulate unevenness of a road surface—which generally stress each wheel differently and which are exerted onto the rolling wheels via the test stand rollers or flat belts—then great vertical motions are brought about in the vehicle. Among other things, swaying also occurs. In this context, swaying refers to a rolling motion of the vehicle by the length of one vehicle axis which, depending on the particular spring deflection of the vehicle wheels, generally moves away from its zero position. Due to these swaying motions, the rigid articulated rod leads to unnecessary motions of the steering wheel, a shifting of the vehicle away from its zero position and also to unstable steering. If the lateral shifting is prevented, for example, by a lateral anchoring or strapping of the vehicle, then inevitably constraining forces are exerted on the vehicle which can interfere with the test results.

The use of a driver entails additional costs and the measured results are influenced by the subjective handling of a situation by a human. Thus, questions arise whether the vehicles adjusted on the test stand in accordance with the particular vertical forces, that is to say, the riding comfort, can be reproducibly transferred to the actual driving behavior when the vehicle is driven on the open road.

SUMMARY OF THE INVENTION

On the basis of this state of the art, the present invention is based on the task of obtaining measured results on the riding comfort which, in addition to the swaying and shaking motions of the vehicle, also includes the avoidance of driving noises in the interior of the car. Also, results are obtained from studies on the noise coming through openings in the closed vehicle such as the trunk lid and the hood when the vehicle is subjected to great vertical forces. This is accomplished without the need for lateral anchoring of the vehicle which would affect the measured results. Moreover, the swaying components which occur in response to great vertical motions do not initiate any additional steering movements.

By means of correction of the steerable wheels only as a function of measurable lateral excursions of a point of a vehicle part from its resting position with respect to a stationary reference point located outside of the vehicle, in the case of great vertical forces the vehicle is kept on the test stand without lateral anchoring while simultaneously all constraining forces are avoided. Excursions occur due to a lateral motion of the vehicle.

In particular, since the rotational motions can be considered to be practically negligible, it is also achieved that, due to such guidance of the vehicle to be tested, even without lateral anchoring, such tests can also be carried out on flat belt test stands on which, for example, each wheel rests on a narrow, vertically movable flat belt.

The steering point on the vehicle is spatially separated with respect to the measuring point for determining the excursion of the vehicle. As a result, in accordance with local circumstances, it is possible to ascertain the lateral motions of the vehicle along its entire side, i.e. swaying. On this basis the steering is influenced only in such a way that overcompensation, which would lead to erroneous measurements, does not occur. Also, errors due to the anchoring of the vehicle cannot occur either.

In another embodiment of the process, pretensioning is allowed to be exerted on the steering plane in the case of transmitting means which must be pretensioned and which only transmit forces in one direction. The result of this is that the pretensioning element itself does not have to be located on the steering plane.

When great vertical motions are exerted by means of the test stand onto at least one pair of the rolling wheels of the vehicle, a device of the present invention measures the lateral motion of a part of the vehicle via at least one sensor with respect to a fixed point. The steerable wheels are steered from a steering point, practically excluding the swaying component only as a function of the lateral motion from the distance difference of the vehicle. The vehicle is prevented from breaking away from the test stand or from flying away from the test stand, without the need for an additional lateral anchoring of the vehicle. Such anchoring would interfere with the measured values and, at the same time, would interfere with a vehicle adjusted in accordance with these values, thus rendering the adjustment of a vehicle non-reproducible.

In another embodiment, a rope connects the reference point via deflection elements with an adjustable radius of the steering wheel of the vehicle to be tested and with which device the adjustable radius of the steering wheel is connected via a spring which provides the pretensioning to a place on the moving vehicle. In this context, the spring which provides the pretensioning for the rope does not have to lie on the same plane as the rope but rather can be located by means of appropriate deflection elements at any place inside or outside of the passenger compartment of the moving vehicle.

Another embodiment uses a hydraulic mechanism consisting of a hydraulic cylinder and a hydraulic piston rod positioned between the reference point and a measuring point on the vehicle's chassis. When the chassis moves laterally as a result of vertical motions, information about the lateral motion is transmitted to a second hydraulic cylinder via hydraulic medium and via hoses. The second hydraulic cylinder rests on the vehicle and is connected to its steering wheel with an adjustable radius. On the basis of the information transmitted to the hydraulic medium, the piston rod of the second hydraulic cylinder, which is connected in an articulated manner with a point of an adjustable radius of the steering wheel, is then used to turn the steering wheel in response to the lateral motions, considering the swaying motion to be practically negligible, and thus to effectuate a steering correction on the test stand.

Instead of hydraulic transmission, it is also possible to use a pneumatic transmission in the same manner for purposes of effectuating a steering correction.

In still another embodiment, an electric signal is transmitted to a control device depending on the distance change and this control signal is transmitted to an actuation device. In this case, the actuation device is preferably positioned in an articulated manner inside the passenger compartment of the vehicle and it interacts with an adjustable radius of the steering wheel with which it is connected in an articulated manner. As a result, corrective steering movements can be transmitted to the steered wheels in an active way.

In another embodiment at least one sensor is shifted with respect to the steering point. This achieves that, on the one hand, independent of the steering point, the swaying motions, for example, of the chassis, can be determined at different places on one side of the vehicle, and that, on the other hand, during the measurement over one side in the lengthwise direction and over the height of the vehicle, it can be determined which other motions the vehicle also makes as a result of the swaying. This makes it possible to draw conclusions about the influence of openings in the chassis, for example, window openings or else influences of roof openings or wheel cases connected to the chassis. On the basis of these tests, it is then also possible to improve the spring properties of the vehicle during the development stage as well as its propensity to noise.

BRIEF DESCRIPTION OF THE DRAWINGS

Novel features and advantages of the present invention in addition to those mentioned above will become apparent to persons skilled in the art from a reading of the following detailed description in conjunction with the accompanying drawings wherein similar reference characters refer to similar parts and in which.

DETAILED DESCRIPTION OF THE INVENTION

Figure 1:
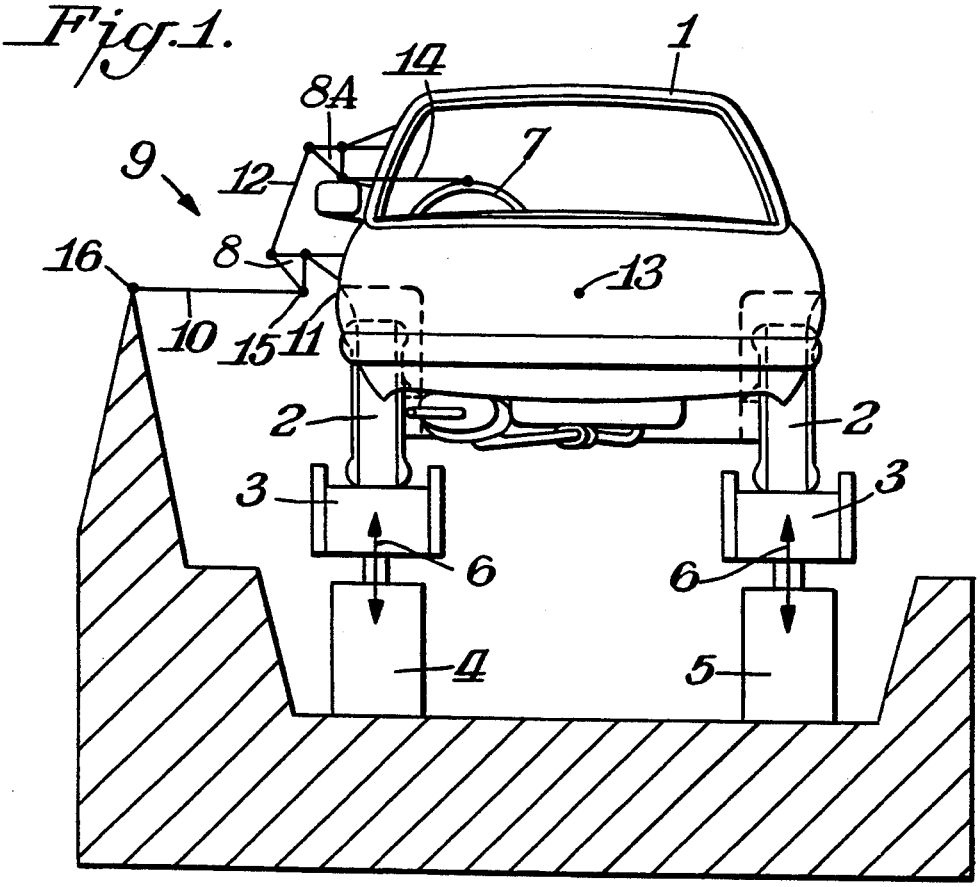
FIG. 1 is a front elevational view of a device for the passive steering of a vehicle subjected to great vertical forces, the steering wheel being connected to a stationary reference point outside of the vehicle, according to the present invention.

Referring in more particularity to the drawings, FIG. 1 shows a vehicle 1 rolling with its steered wheels 2 on a test stand 3. It does not matter whether the test stand 3 is a drum-type test stand or a flat belt test stand, as is shown in FIG. 1. Likewise, it does not matter whether the rolling steered wheels 2 are driven by the vehicle 1 or are driven by the test stand 3, or whether the test stand 3 and the vehicle 1 are both driving the wheels at the same time.

The test stand 3 is supported on a device 4 and on another device 5 which are designed to exert vertical forces. Double arrows 6 illustrate that the device 4 and the additional device 5 can exert vertical forces independently of each other, so that, for example, the flat belt test stands 3 may transmit vertical forces of different strengths onto the steered wheels 2. The frequency of the vertical force between the device 4 and the additional device 5 can also be different in magnitude so that, in addition to an inclined positioning of the vehicle 1, the different force frequencies also have an effect which influences the steering of the vehicle 1 and thus will lead to a steering correction which manifests itself at the steering wheel 7. Instead of the steering wheel 7, it is also possible to use the steered wheels 2 or else the steering rods (not shown here), for example, the gauge rod of the vehicle, as the point of application for the steering correction which is brought about, as described above.

Due to the rod arrangement 9, consisting of a rod 10 which is horizontal in its basic position, i.e. in the middle position of the vertical force, and of a deflection element 8, only the lateral motions and not the rotational components, are transmitted by sensing chassis 11 during the swaying of the vehicle 1 when the horizontal rod 10 is located at the height of the swaying axis 13 when the vehicle 1 is not swaying. Consequently, this achieves that the end point of the rod be on the chassis side carries out practically no lateral motion during the swaying of the vehicle. The other end of the rod 10 is attached in an articulated manner to a fixed point of the building or of the test stand and thus serves as a stationary reference point 16.

The deflection element 8 transmits the lateral motion of the vehicle determined with respect to the end of the rod 10 on the chassis side via a rigid connection rod 12, which is connected in an articulated manner, to another deflection element 8A attached to the vehicle and to a rigid steering rod 14 which is likewise connected in an articulated manner to the steering wheel 7. In this case, the steering rod 14 is connected in an articulated manner to an adjustable radius of the steering wheel 7.

In the simplest case, the adjustable radius consists of a rod of any length attached to the turning point of the steering wheel and to the periphery of the steering wheel. Thus this rod can also extend beyond the steering wheel. By shifting the point of application of the steering rod 14, the sensitivity of the steering reaction can be influenced.

The lever ratios of the deflection elements 8 and 8A are likewise adjustable. As a result, the amplification of the rod arrangement 9 can be adapted to the gearing of the steering mechanism of the vehicle.

These rod arrangements 9 should be seen especially as an inventive embodiment for the passive steering of a vehicle 1 to be tested. Passive steering refers to the rod arrangement 9 by means of which the vehicle 1 is steered via the steering wheel 7 without additionally imparted energy. In contrast to such passive steering, active steering refers to the steering of the vehicle 1 with additionally imparted energy.

By means of the passive steering of the vehicle on the test stand shown in FIG. 1, the vehicle is steered as a function of the vehicle's lateral motions that occur, but practically without influences by swaying motions. This passive steering, by means of which the rotational component is practically compensated for when the vehicle sways, also makes it possible to reliably steer the vehicle to be tested on the narrow flat belt merely by passive steering.

Due to the adjustability and adaptability of the horizontal rod 10 in accordance with the swaying axis of the vehicle to be tested, of the stationary reference point 16, of the deflection element 8 and of the additional deflection element 8A and of the connection rod 12 and of the steering rod 14, such a rod arrangement can be installed at any place along one side of the chassis of the vehicle 1. It is not necessary for the horizontal rod 10 to always be positioned on a vertical plane below the steering rod 14. Thus, the lateral motion of one side of the vehicle can also be measured under the influence of swaying.

Figure 2:
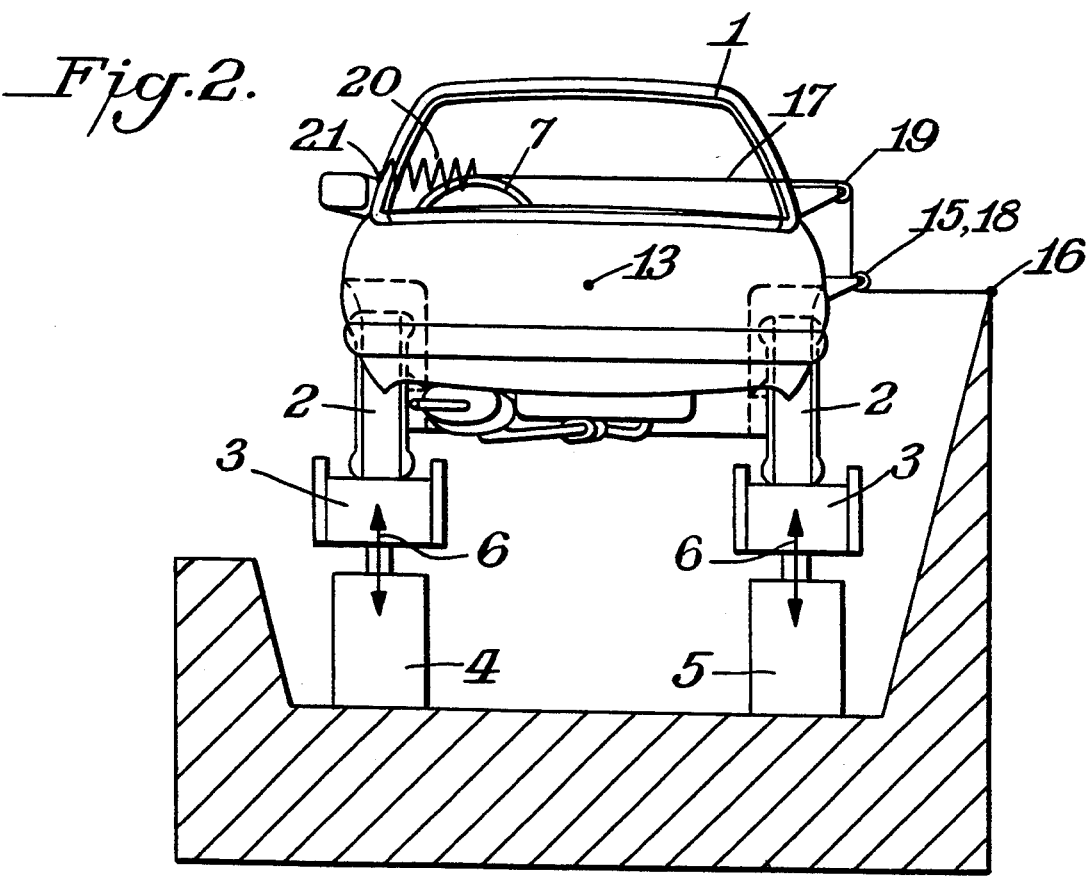
FIG. 2 is a front elevational view of another device for the passive steering of a vehicle, according to the present invention.

The embodiment of a passive steering system with sway compensation is illustrated in FIG. 2. The vehicle 1 is positioned with its steered wheels 2 on the flat belts of the vehicle test stand. The flat belts are moved in a vertical direction 6 by the device 4 and the additional device 5.

In this case, the reference point 16 is connected with a radius of the steering wheel 7 via a rope 17 by means of a lower deflection roller 18 and an upper deflection roller 19. The rope 17 is a means with which the force can be transmitted in just one direction. Only during the pretensioning can the force be exerted in two directions. In the process, the lower deflection roller 18 serves at the same time as the measuring point 15 for determining the lateral excursion of the vehicle. The lower deflection roller 18 and the upper deflection roller 19 are attached to the vehicle 1 in such a way that they can be removed, but the lower deflection roller 18 is attached at the height of the swaying axis 13 of the vehicle 1 in such a way that the rope 17 runs in a horizontal direction between the measuring point 15 and the reference point 16 when the vehicle is in its basic position.

A spring 20 consisting of metal, non-metal, plastic or the like functions as a pretensioning mechanism. The spring is attached to the vehicle 1 at a point 21 and on the steering wheel 7 at a radius. It has the effect that the rope 17 can transmit forces in both directions. In this context, the point 21 does not have to be located at the place shown in FIG. 2, but rather can be at any place inside the vehicle, as long as care is taken that the direction of effect of the spring 20 is on one plane with the adjustable radius. By means of the above mentioned system, the lateral motion of the vehicle 1 is now transmitted onto the steering wheel 7 at the measuring point 15 as a steering correction whereby the influence of the swaying by the swaying axis 13 is practically eliminated.

With the device of FIG. 2, it does not matter whether the lower deflection roller 18 and the upper deflection roller 19 are on a plane vertically above each other or not.

By adapting the point of application of the rope 17 on the radius of the steering wheel 7, the amplification of the steering device can be adapted to the gearing of the vehicle's steering mechanism.

Figure 3:
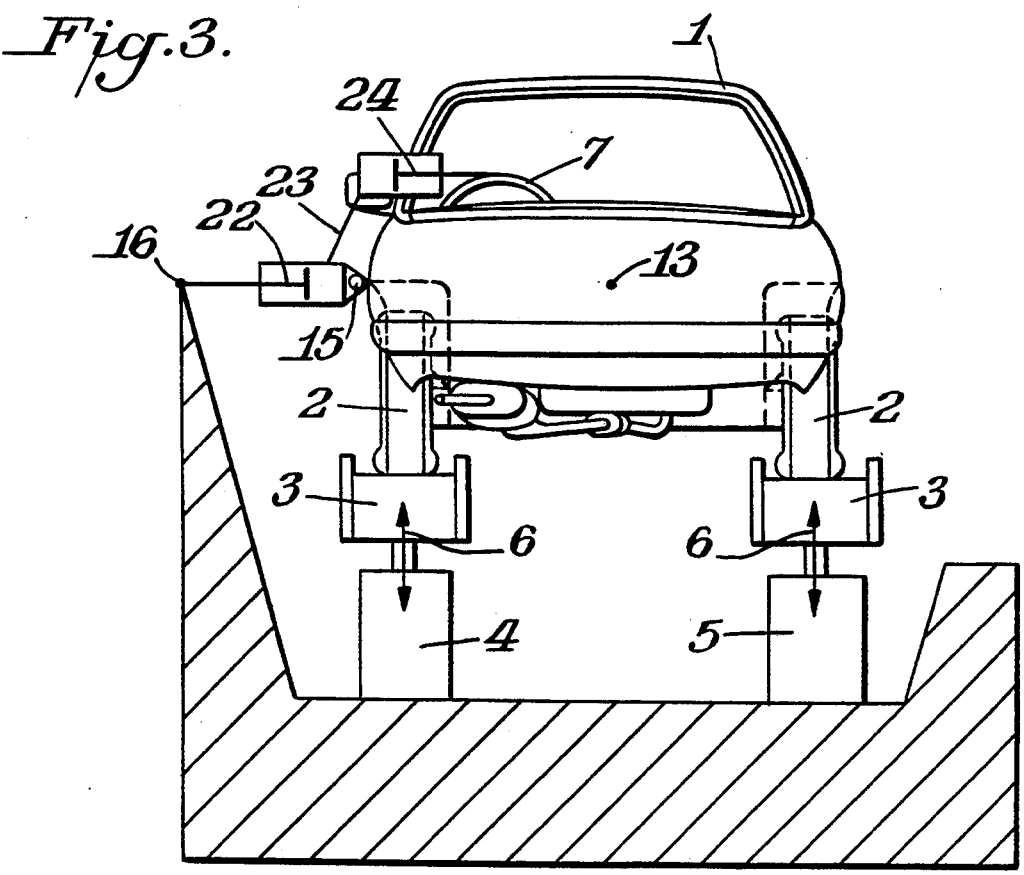
FIG. 3 is a front elevational view of still another device for the passive steering of a vehicle, according to the present invention.

The embodiment of another passive steering system with sway compensation is illustrated in FIG. 3. The vehicle 1 is positioned with its steered wheels 2 on the flat belts 3 of the vehicle test stand. The flat belts are moved in a vertical direction 6 by the devices 4 and 5.

In this particular case, the reference point 16 is connected to the measuring point 15 of the vehicle via a horizontally arranged hydraulic cylinder and piston rod 22. Preferably, the cylinder and piston lie at the height of the swaying axis 13. This hydraulic cylinder and piston rod 22 are connected via hydraulic hoses 23 to another hydraulic cylinder with another piston rod 24. This piston rod engages an adjustable radius of the steering wheel 7. Due to the lateral motion of the measuring point 15, a hydraulic medium is now displaced in the hydraulic cylinder with the actuation rod 22 and made to flow via the hoses 23 into the additional hydraulic cylinder with the additional piston rod 24. This piston rod transmits the lateral motion of the measuring point 15 as a steering correction to the adjustable radius of the steering wheel 7. The adjustable radius of the steering wheel 7 represents the adaptation of the amplification.

The advantage of this device is that it can be operated by means of thin hoses 23 which can pass through the door seal of the vehicle 1 when the door is closed. As a result, tests can be carried out while the doors and windows of the vehicle are closed.

Figure 4:
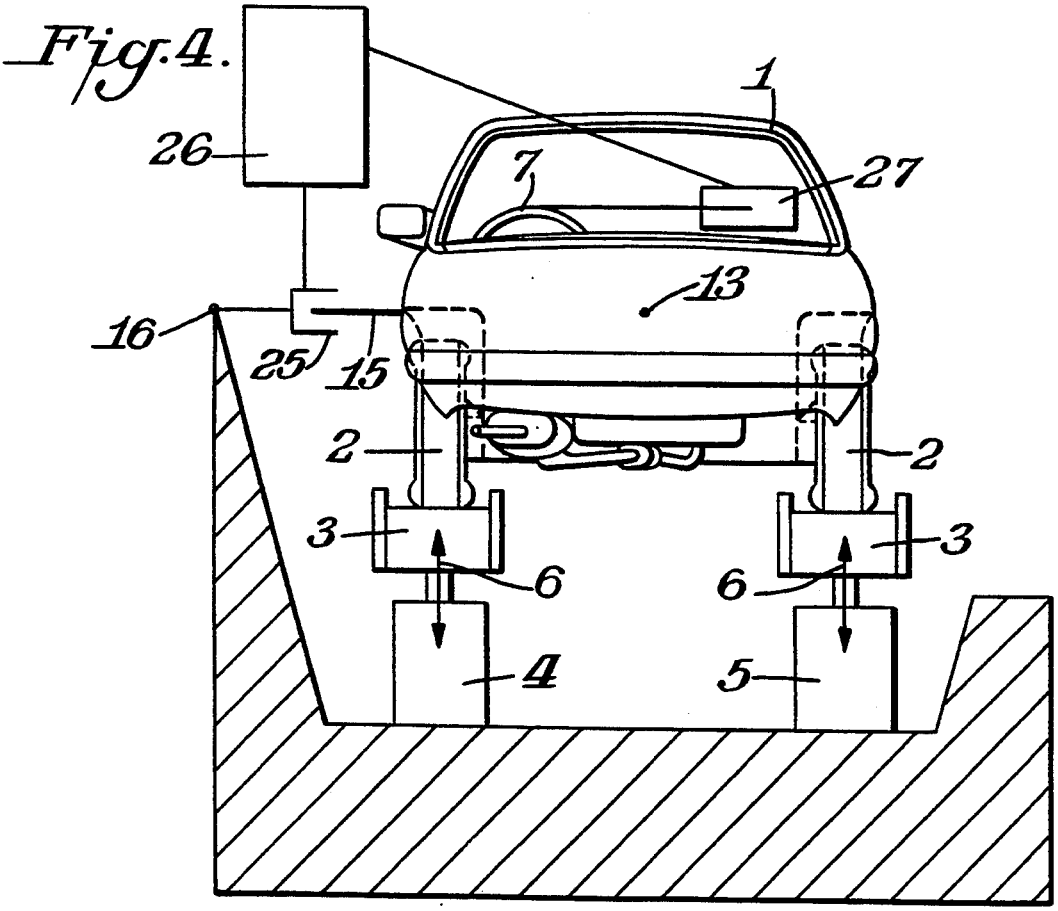
FIG. 4 is a front elevational view of a device for the active steering of a vehicle, according to the present invention.

The embodiment of an active steering system with sway compensation illustrated in FIG. 4 shows the vehicle 1 standing with its steered wheels 2 on the vehicle test stand with flat belts 3. The belts are moved in a vertical direction 6 by the device 4 and the additional device 5.

In this case, the reference point 16 is connected to the measuring point 15 of the vehicle via a horizontally positioned position sensor 25. This position sensor 25 preferably lies at the height of the swaying axis 13. The position sensor can preferably be an inductive, a resistance or a non-contact measuring device, which uses light, for example. The position sensor 25 reports the lateral excursion of the measuring point 15 of the vehicle to a control unit 26. This unit evaluates the signal and transmits a steering correction to the active control element 27. This active control element 27 rests on one side of the vehicle and on the other side on an adjustable radius of the steering wheel 7 thereby transmitting the steering correction to the steering wheel 7.

The active control element 27 is preferably designed as an electric element such as, for example, an electric spindle, but other designs with regulated pneumatic and hydraulic cylinders are also possible. With this version of the steering device, tests are also possible while the doors and windows of the vehicle 1 are closed.

What is claimed is:

1. Device for steering vehicle wheels of a vehicle (1) located on a test stand, the vehicle having a chassis (11), a steering wheel (7) and wheels (2) rolling on the test stand, characterized in that, when vertical motions (6) are exerted via the test stand onto at least one pair of the rolling wheels (2) of the vehicle (1), lateral motions of the vehicle (1) with respect to a reference point (16) lying in a horizontal plane with a longitudinal sway axis (13) about which the vehicle may rotate are transmitted via a rod (10) lying on a line between the reference point (16) and the sway axis (13) releasably connected in an articulated manner to a deflection element (8) attached to the chassis (11) of the vehicle (1) and to a connection rod (12) connected in an articulated manner to a second deflection element (8A) releasably attached to the chassis (11) of the vehicle (1), and in that, via a steering rod (14) positioned in an articulated manner on the second deflection element (8A) and connected to the steering wheel (7), only the horizontally effectuated lateral motion components of the vehicle (1) are transmitted for purposes of carrying out correction movements.

2. Device for steering vehicle wheels of a vehicle (1) standing on a test stand, the vehicle having a chassis (11), a steering wheel (7) and wheels (2) rolling on the test stand, characterized in that, when vertical motions (6) are exerted via the test stand onto at least one pair of the rolling wheels (2) of the vehicle (1), lateral motions of the vehicle (1) with respect to a reference point (16) lying in a horizontal plane with a longitudinal sway axis (13) about which the vehicle may rotate are determined in such a way that the reference point (16) is connected to the steering wheel (7) via a rope (17) by means of a lower deflection roller (18) releasably connected to the chassis (11) of the vehicle (1) having a roller axis positioned on a line between the reference point (16) and the sway axis (13), and an upper deflection roller (19) releasably attached to the chassis (11) of the vehicle (1), and a spring (20) located on the chassis (11) of the vehicle (1) engaging the steering wheel (7).

3. Device for steering vehicle wheels of a vehicle (1) located on a test stand, the vehicle having a chassis (11), a steering wheel (7) and wheels (2) rolling on the test stand, characterized in that, when vertical motions (6) are exerted via the test stand onto at least one pair of the rolling wheels (2) of the vehicle (1), lateral motions of the vehicle (1) with respect to a reference point (16) lying in a horizontal plane with a longitudinal sway axis (13) about which the vehicle may rotate are determined in such a way that the reference point (16) is in contact with a measuring point (15) present on the chassis (11) of the vehicle (1) via a hydraulic cylinder with a piston rod (22) and hydraulic medium, the measuring point (15) being positioned on a line between the reference point (16) and the sway axis (13), another hydraulic cylinder with a piston rod (24) connected between the chassis (11) of the vehicle (1) and the steering wheel (7), and a hydraulic hose (23) interconnecting the hydraulic cylinders together whereby lateral movements of the vehicle displace the hydraulic fluid and turn the steering wheel in a corrective manner.

4. Device for steering vehicle wheels of a vehicle (1) located on a test stand, the vehicle having a chassis (11), a steering wheel (7) and wheels (2) rolling on the test stand, characterized in that, when vertical motions (6) are exerted via the test stand onto at least one pair of the rolling wheels (2) of the vehicle (1), lateral motions of the vehicle (1) with respect to a reference point (16) lying in a horizontal plane with a longitudinal sway axis (13) about which the vehicle may rotate are determined in such a way that there is a position sensor (25) between a measuring point (15) present on the chassis (11) of the vehicle (1) and the reference point (16), the measuring point (15) being positioned on a line between the reference point (16) and the sway axis (13) that as a function of the lateral motions of the measuring point (15) when vertical forces are exerted, a control signal from the position sensor (25) is transmitted to a control unit (26) connected to transmit a signal for a steering correction to an active control element (27) removably connected to the chassis (11) of the vehicle (1) and the steering wheel (7) in an articulated manner whereby the steering wheel (7) is turned as a function of the steering correction.

* * * * *